(12) United States Patent
Serrano

(10) Patent No.: US 8,317,147 B1
(45) Date of Patent: Nov. 27, 2012

(54) SOLAR LIGHT STICK HOLDER DEVICE

(76) Inventor: Miguel Serrano, Valrico, FL (US)

( * ) Notice: Subject to any disclaimer, the term of this patent is extended or adjusted under 35 U.S.C. 154(b) by 0 days.

(21) Appl. No.: 12/959,019

(22) Filed: Dec. 2, 2010

Related U.S. Application Data

(63) Continuation-in-part of application No. 29/370,007, filed on May 26, 2010.

(51) Int. Cl.
*A47H 1/16* (2006.01)

(52) U.S. Cl. ..... 248/302; 248/112; 248/315; 248/309.1; 248/317

(58) Field of Classification Search ........... 248/302; 43/21.2; D7/536, 648; D8/70; D26/26, D26/60, 67, 72, 138, 140, 145, 155
See application file for complete search history.

(56) References Cited

U.S. PATENT DOCUMENTS

| | | | | |
|---|---|---|---|---|
| 1,916,351 | A | * | 7/1933 | Whitman ............. 169/26 |
| 2,456,535 | A | * | 12/1948 | Rundell ............. 248/302 |
| D168,820 | S | * | 2/1953 | Beltramini ............. D8/370 |
| D222,527 | S | | 11/1971 | Ziaylek, Jr. |
| 3,883,934 | A | * | 5/1975 | Rochfort ............. 248/65 |
| 3,907,183 | A | | 9/1975 | Shearer, Sr. et al. |
| 4,557,452 | A | | 12/1985 | Khuong |
| 4,893,788 | A | * | 1/1990 | Chave ............. 256/47 |
| 6,220,557 | B1 | | 4/2001 | Ziaylek et al. |
| 7,513,633 | B2 | | 4/2009 | Ermeti |
| 2007/0108364 | A1 | | 5/2007 | Metheny |

* cited by examiner

*Primary Examiner* — Teri P. Luu
*Assistant Examiner* — Erin W Smith

(57) ABSTRACT

A solar light stick holder comprising a single wire having a first end and a second end, a first extension arm and a second extension arm, a connecting base, a first holder-loop and a second holder-loop. The first end and second end each forms a loop for holding the solar light stick. The connecting base comprises at least one screw-loop to secure the holder to a fixture.

1 Claim, 3 Drawing Sheets

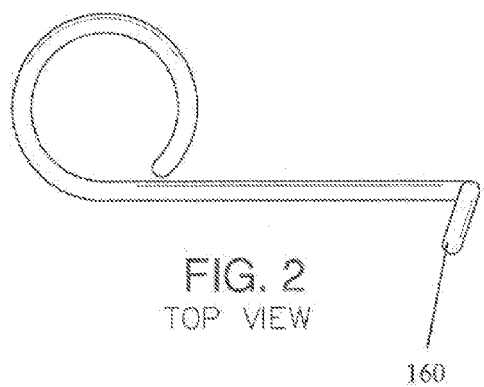
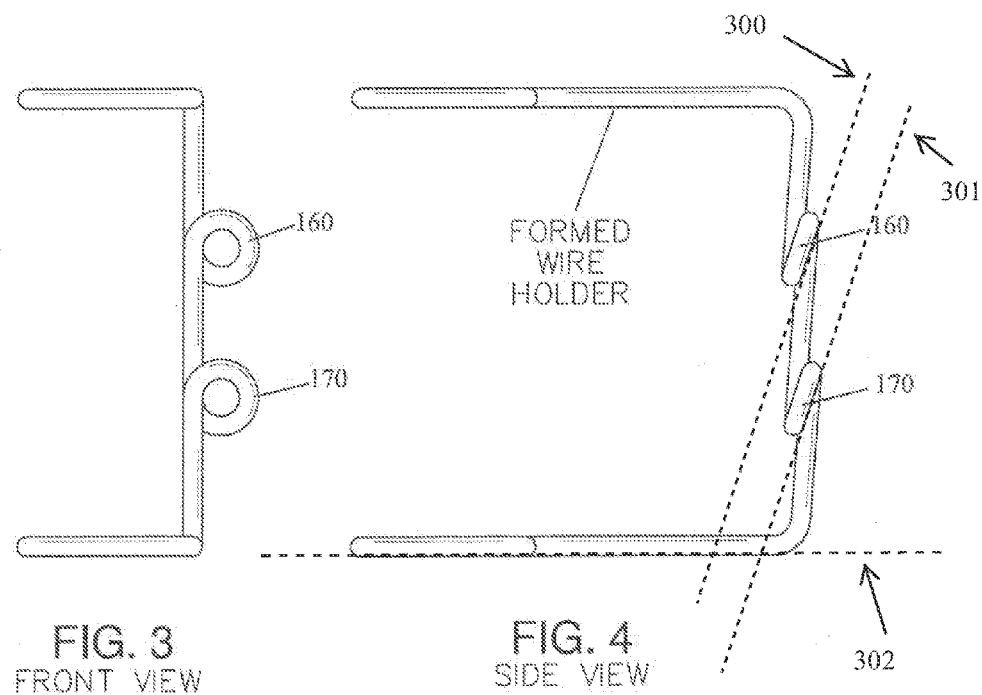

SOLAR LIGHT STICK HOLDER DEVICE

CROSS REFERENCE

This application claims priority to U.S. design patent application serial number 29/370,007 filed May 26, 2010, the specification of which is incorporated herein by reference in its entirety.

BACKGROUND OF THE INVENTION

The present invention features a solar light stick holder that allows for versatile display of the solar light stick at various positions on a residential or commercial property. For example, the holder of the present invention allows the solar light stick to be secured to a fence, a porch or any above ground pole or fixture, thereby allowing the solar stick to be placed in various positions, and eliminating the need to limit the use of the solar light stick to the ground only.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 2 is a top view of the solar stick holder.
FIG. 3 is a front view of the solar stick holder.
FIG. 4 is a side view of the solar stick holder.

DESCRIPTION OF PREFERRED EMBODIMENTS

Figure 1:
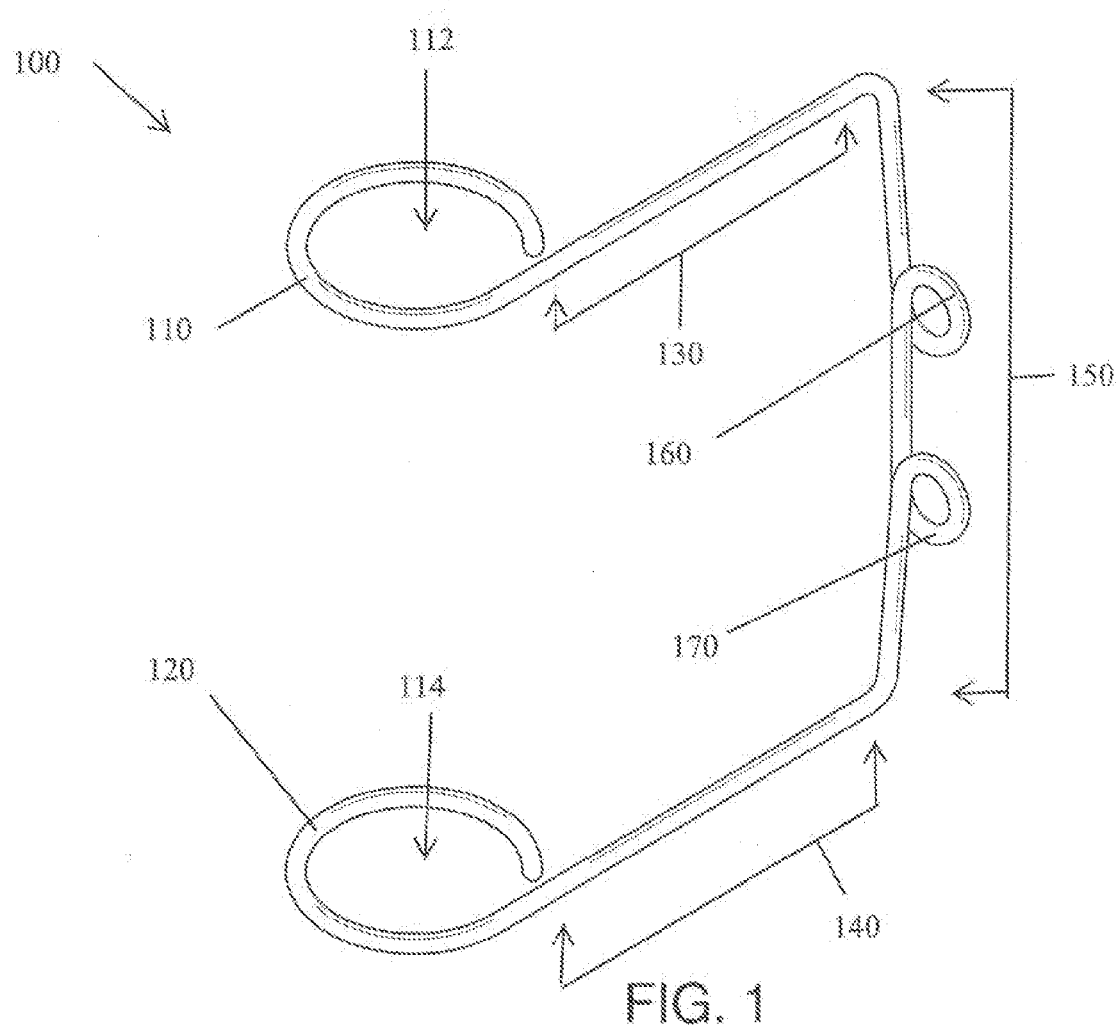
FIG. 1 is a perspective view of the solar stick holder.

Referring now to FIGS. 1-5, the present invention features a solar light stick holder 100 formed from a single wire having a first end 110 and a second end 120, a first extension arm 130 and a second extension arm 140, a connecting base 150, a first holder-loop 112 and a second holder-loop 114. The single wire is shaped such that the first end 110 forms a first holder-loop 112 adapted to encircle and secure a shaft of the solar light stick. The second end 120 forms a second holder-loop 114 adapted to encircle and secure the same shaft of the solar light stick. The first holder-loop 112 and second holder-loop 114 are on parallel planes. The plane of the first holder-loop is formed, for example, by a flat piece of paper being placed onto the flat surface of the loop (i.e., the lip of the loop, or the circular rim of the loop) where the paper can sit or rest on the flat surface of the loop. That piece of paper defines the plane of the first holder-loop. The plane of the second holder-loop is similarly defined with its respective loop.

The diameter of the first/second holder-loop may be of any size to fit a standard shaft of a solar light stick. For example, the diameter size may be from ¾ of an inch to 2 inches.

The first extension arm 130 and the second extension arm 140 extend from the first holder-loop 112 and second holder-loop 114, respectively, in the same direction towards the connecting base 150 and being parallel and on the same plane with each other and each joining the connecting base 150. The plane where the first extension arm 130 and second extension arm 140 lie on can be formed by a piece of paper that can be placed flatly on these two arms.

The connecting base 150 has a section that twists around 360 degrees for the first time to form the first screw-loop 160 and then the connecting base twists around 360 degrees for the second time to form a second screw-loop 170. The first screw-loop and second screw-loop are each on a separate plane where those planes are parallel to each other. The planes of the first or second screw-loop may be defined by a piece of paper that can be placed flatly against the lip of the loops.

Figure 5:
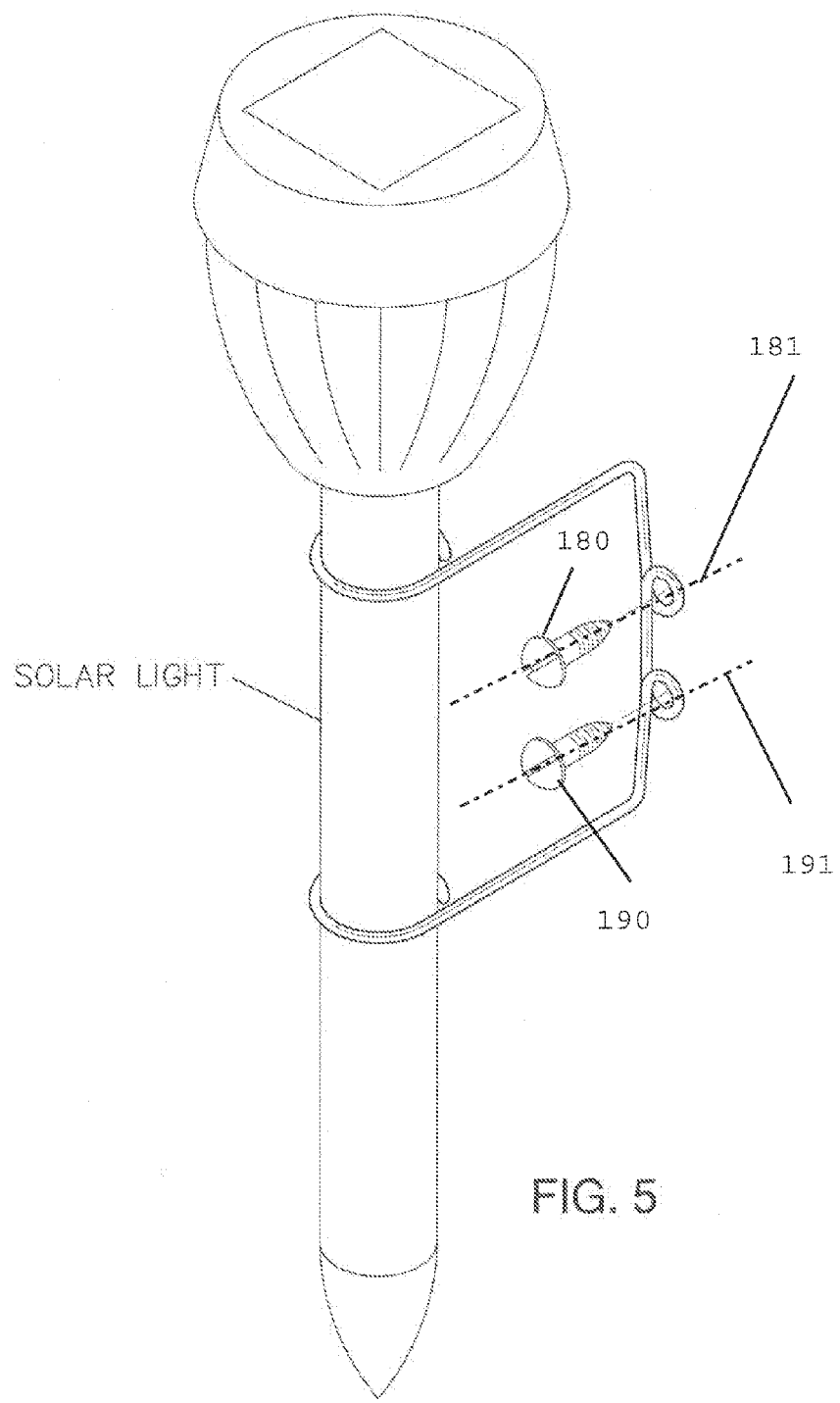
FIG. 5 is a perspective view of the solar stick holder, showing the solar stick inserted into the first and second holder-loops, and a set of screws to be inserted through the first/second screw-loops.

The plane of the first screw-loop 160 and the plane of the second screw-loop 170 are perpendicular to the plane of the first extension arm 130 and second extension arm 140; wherein the first screw-loop and second screw-loop are configured such that when a set of screws 180 and 190 to be inserted through the first/second screw-loops, the axis of the screws 181 and 191 are parallel to the first extension arm 130 and second extension arm 140, as shown in FIG. 5. Further the planes 300/301 of the first screw-loop 160/170 intersect a plane 302 that arm 140 lie on, wherein the second end 120 that forms the second holder-loop 114 also lie on plane 302 as shown in FIG. 4.

In some embodiments, a screw may be inserted through the first screw-loop/second screw-loop to secure the solar stick holder to a fence, a porch or any above ground pole or fixture, thereby allowing the solar stick to be placed in various positions, and eliminating the need to limit the use of the solar light stick to the ground only. The diameter of the first/second screw-loop may be of any size to fit a conventional screw. For example, the size may be from about ⅛ of an inch to ¼ of an inch.

Any wire may be used to form the solar light stick holder of the present invention, as long as the wire can firmly hold its shape.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:
1. A solar light stick holder (100) comprising a single wire having:
  (a) a first end (110) and a second end (120);
  (b) a first extension arm (130) and a second extension arm (140);
  (c) a connecting base (150);
  (d) a first holder-loop (112) and a second holder-loop (114);
    wherein the single wire is shaped such that:
    said first end (110) forms said first holder-loop (112) adapted to encircle and secure a shaft of a solar light stick, said second end (120) forms said second holder-loop (114) adapted to encircle and secure said shaft of the solar light stick, said first holder-loop (112) and said second holder-loop (114) are on parallel planes;

the first extension arm (130) and the second extension arm (140) extend from the first holder-loop (112) and the second holder-loop (114), respectively, in the same direction towards the connecting base (150) and are parallel and on the same plane with each other and each joining said connecting base (150);

said connecting base has a section that twists around 360 degrees to form a first screw-loop (160) and then the connecting base twists around 360 degrees for a second time to form a second screw-loop (170), wherein said first screw-loop and are second screw-loop are each on their own respective plane and those planes are parallel to each other; wherein the plane of the first screw-loop (160) intersects a plane (302) created by said second arm, wherein said second end (120) forms said second holder-loop (114) also lies on the plane (302);

wherein the first screw-loop and the second screw-loop are configured such that when a set of screws are inserted through the first and second screw-loops, the axis of the screws are parallel to the first extension arm (130) and the second extension arm (140).

\* \* \* \* \*